(12) United States Patent
Robinson et al.

(10) Patent No.: US 10,858,026 B2
(45) Date of Patent: Dec. 8, 2020

(54) NESTABLE SHOPPING TROLLEY

(71) Applicant: MULTI-LEVEL RETAIL LIMITED, Essex (GB)

(72) Inventors: Mark Robinson, Hertfordshire (GB); Stuart Barnett, Essex (GB)

(73) Assignee: MULTI-LEVEL RETAIL LIMITED, Essex (GB)

( * ) Notice: Subject to any disclaimer, the term of this patent is extended or adjusted under 35 U.S.C. 154(b) by 0 days.

(21) Appl. No.: 16/346,258

(22) PCT Filed: Nov. 2, 2017

(86) PCT No.: PCT/GB2017/053303
§ 371 (c)(1),
(2) Date: Apr. 30, 2019

(87) PCT Pub. No.: WO2018/083478
PCT Pub. Date: May 11, 2018

(65) Prior Publication Data
US 2019/0256118 A1    Aug. 22, 2019

(30) Foreign Application Priority Data
Nov. 2, 2016   (GB) .................................. 1618467.3

(51) Int. Cl.
*B62B 3/14* (2006.01)
*B62B 3/02* (2006.01)

(52) U.S. Cl.
CPC .............. *B62B 3/1468* (2013.01); *B62B 3/02* (2013.01); *B62B 3/027* (2013.01); *B62B 3/14* (2013.01);
(Continued)

(58) Field of Classification Search
CPC ....... B62B 3/14; B62B 3/1404; B62B 3/1468; B62B 3/18; B62B 3/027
See application file for complete search history.

(56) References Cited

U.S. PATENT DOCUMENTS 2,958,536 A * 11/1960 Young ...................... B62B 3/18
                                                        280/33.995
3,706,460 A * 12/1972 Thomas ................... B62B 3/18
                                                        280/33.995
5,265,893 A     11/1993 Ettlin

FOREIGN PATENT DOCUMENTS

CN      101301898 A     11/2008
CN      202987233 U      6/2013
(Continued)

OTHER PUBLICATIONS

Apr. 26, 2017—UK Search Report—GB1618467.3.
Feb. 8, 2018—ISR & WO—PCT/GB2017/053303.

*Primary Examiner* — Erez Gurari
(74) *Attorney, Agent, or Firm* — Banner & Witcoff, Ltd.

(57) ABSTRACT

A nestable shopping trolley (10) comprising a basket (100) defining an interior space and having a hingable wall (120) formed by a flap (125) having a first horizontal hinge (500) enabling the flap to rotate into the interior space. The nestable shopping trolley (10) also comprises a first shelf 600 having a supporting surface (605), a stowed position and a horizontal position. The nestable shopping trolley (10) also comprises a second horizontal hinge (620) connecting the first shelf 600 to a first side wall (140) of the basket (100), wherein the second horizontal hinge (620) enables movement of the first shelf (600) between the stowed and horizontal positions. The present invention also provides a kit for adapting a basket (100) of a nestable shopping trolley (10) and a method of adapting a basket (100) of a nestable shopping trolley (10).

20 Claims, 15 Drawing Sheets

(52) U.S. Cl.
CPC ........ *B62B 3/1472* (2013.01); *B62B 2205/33* (2013.01)

(56) References Cited

FOREIGN PATENT DOCUMENTS

| | | |
|---|---:|---:|
| DE | 2327590 A1 | 12/1974 |
| DE | 20 2006 016248 U1 | 1/2007 |
| EP | 0057800 A | 8/1982 |
| EP | 0476970 A1 | 3/1992 |
| EP | 1 449 739 A2 | 8/2004 |
| GB | 2512943 A | 10/2014 |
| NL | 1024964 C2 | 6/2005 |

\* cited by examiner

NESTABLE SHOPPING TROLLEY

FIELD OF THE INVENTION

The present invention relates to a nestable shopping or supermarket trolley, a method of adapting a basket of a nestable shopping or supermarket trolley and a kit for adapting a basket of a nestable shopping or supermarket trolley.

BACKGROUND OF THE INVENTION

Typically, nestable shopping or supermarket trolleys have a basket defining an interior space for holding items. The basket is forwardly tapered and has a base, a hingable wall, a front wall opposing the hingable wall and opposing side walls. The hingable wall of the basket is formed by a flap having a horizontal hinge enabling the flap to rotate into the interior of the basket. The width of the flap is less than the distance between the opposing side walls at the rear of the basket. Therefore, gaps are formed on either side of the flap between the flap and the opposing side walls to prevent the side walls interfering with the movement of the flap. Each gap is generous in size to accommodate distortions in the trolley that may occur following repeated use. The flap enables several trolleys of the same type to be nested together.

On nesting, the front end of the basket of a second trolley pushes the flap of a first trolley upwards and into the basket interior of the first trolley. Once nested, the flap of the first trolley rests on the top edge of the second trolley.

One of the challenges when using such trolleys is ensuring that softer items, such as fruit, are not damaged by heavier items, such as beverages, which are also located within the basket. One approach is to divide the basket into sections but this lacks flexibility as the sizes of the sections are fixed.

SUMMARY OF THE INVENTION

The present invention seeks to improve standard, nestable shopping or supermarket trolleys, while maintaining their nesting functionality, to ensure that softer items within the basket are not damaged by heavier items also located within the basket. Existing trolleys may be adapted using a kit or new trolleys may be manufactured using the described improvements.

In the present invention, there is provided a nestable shopping or supermarket trolley comprising a basket defining an interior space and having a hingable wall formed by a flap having a first horizontal hinge enabling the flap to rotate into the interior space; characterized by:

a first shelf having a supporting surface, a stowed position and a horizontal position; and
 a second horizontal hinge connecting the first shelf to a first side wall of the basket, wherein the second horizontal hinge enables movement of the first shelf between the stowed and horizontal positions.

In the stowed position, the shelf is substantially parallel to the side walls of the basket (and rests vertically) and in the horizontal position, the shelf is substantially perpendicular to the side walls of the basket (i.e. horizontal). The shelf moves between the stowed position and the horizontal position by rotating about the second horizontal hinge.

Preferably, the first shelf and the flap are configured such that, when the flap rotates into the interior space of the basket, the flap causes the first shelf to move from the horizontal position to the stowed position and, when in the stowed position, the supporting surface of the first shelf abuts the first side wall.

This is advantageous, since, when nesting two trolleys of the present invention together, the shelf is also automatically moved to its stowed position for storage without any additionally action from a user (i.e. by the action of pushing the front of one trolley into the rear of another). For nesting two trolleys of the present invention together, the front end of the basket of a second trolley pushes the flap of a first trolley into the interior of the basket of the first trolley and upwards. The upward movement of the flap causes the shelf to also move upwards and from the horizontal position to the stowed position.

Preferably, the nestable shopping trolley further comprises a second shelf having a supporting surface, a stowed position and a horizontal position and a third horizontal hinge connecting the second shelf to a second side wall of the basket, wherein the second side wall opposes the first side wall, wherein the third horizontal hinge enables movement of the second shelf between the stowed and horizontal positions.

Preferably, the second shelf and the flap are configured such that, when the flap rotates into the interior space of the basket, the flap causes the second shelf to move from the horizontal position to the stowed position and, when in the stowed position, the supporting surface of the second shelf abuts the second side wall.

Attaching a shelf to each side wall is advantageous, since this provides additional flexibility in terms of dividing the trolley into sections.

Preferably, the first horizontal hinge extends in a transverse direction of the basket and the second horizontal hinge extends in a longitudinal direction of the basket. This is advantageous, since it ensures that upward movement of the flap causes upward movement of the shelf without causing jamming of the shelf and the flap.

Preferably, the third horizontal hinge extends in the longitudinal direction of the basket. This is advantageous, since it ensures that upward movement of the flap causes upward movement of the shelves without causing jamming of either the shelves or the flap.

Preferably, the flap is of a width such that a gap is formed between the first side wall and the flap and between the second side wall and the flap, further wherein a thickness of each shelf is less than the size of each gap. This is advantageous, since, once the shelf has been moved into its stowed position, movement of the flap is not obstructed and the shelves do not jam between the flap and the first and second side walls when the trolley nests with another.

Preferably, each shelf is located in a first plane and extends between the respective side wall and a centre of the basket such that, when in the horizontal position, the first and second shelves form a first layer extending between the first and second side walls (i.e. transverse to the normal direction of travel). More preferably each shelf also extends between a first end proximal to the hingable wall (i.e. the end of the trolley that is usually pushed) and a second end proximal to the front wall of the basket such that, when in the horizontal position, the first and second shelves form a first layer extending between the hingable wall and the front wall (i.e. in the normal direction of travel for the trolley).

This is advantageous, since the layer extends over the entire surface area of the base of the basket maximising the surface area of the structure for supporting goods off the base of the trolley. Furthermore, providing a layer that extends over the entire surface area of the base of the basket prevents items from rolling off a shelf and damaging items below.

Preferably, the nestable shopping trolley further comprises support means configured to support each shelf in the horizontal position. More preferably, the support means is attached to the hingable wall and the front wall of the basket.

This is advantageous, since the support means attached to the hingable wall may support both the first end of the first shelf and the first end of the second shelf. Similarly, the support means attached to the front wall may support both the second end of the first shelf and the second end of the second shelf.

Preferably, the nestable shopping trolley comprises securing means for securing each shelf in the stowed position, wherein the securing means comprises first engagement means located on each shelf and corresponding engagement means located on the respective side wall. This is advantageous, since the upward movement of the hingable wall may cause the first engagement means on each shelf to engage with the corresponding engagement means on the basket thereby securing each shelf in the stowed position. On disengaging the trolleys, the flap returns to form the hingable wall of the basket. This movement is not obstructed by the shelves, since the shelves are secured in the stowed position. A user may then access the shelf, disengage the shelf from the stowed position and move the shelf from the stowed configuration to the horizontal configuration for use.

More preferably, the first engagement means is a first magnet and the second engagement means is a second magnet subject to the attraction of the first magnet. This is advantageous, since the shelves may be reliably secured in the stowed position, which is required for nesting the trolleys together.

The present invention also pertains to a kit for adapting a basket of a nestable shopping or supermarket trolley, the basket defining an interior space and having a hingable wall formed by a flap having a first horizontal hinge enabling the flap to rotate into the interior space, the kit comprising:
  a first shelf having a supporting surface; and
  a second horizontal hinge fixed to the first shelf and configured to connect the first shelf to a first side wall of the basket such that, once connected, the second horizontal hinge enables movement of the first shelf between a stowed position and a horizontal position.

The kit of the present invention is advantageous, since it enables a user to easily adapt a standard, nestable shopping trolley to include a shelf without altering the nesting functionality of the trolley or making other changes to the trolley.

Preferably, the first shelf and the flap are configured such that, when the flap rotates into the interior space of the basket, the flap causes the first shelf to move from the horizontal position to the stowed position and, when in the stowed position, the supporting surface of the first shelf abuts the first side wall.

Preferably, the kit further comprises:
  a second shelf having a supporting surface;
  a third horizontal hinge fixed to the second shelf and configured to connect the second shelf to a second side wall of the basket such that, once connected, the third horizontal hinge enables movement of the second shelf between the stowed and horizontal positions.

Preferably, the second shelf and the flap are configured such that, when the flap rotates into the interior space of the basket, the flap causes the second shelf to move from the horizontal position to the stowed position and, when in the stowed position, the supporting surface of the second shelf abuts the second side wall.

This is advantageous, since the shelf may be automatically moved to its stowed position for storage on nesting two trolleys together without any additionally action from a user, as discussed above.

Preferably, the first horizontal hinge extends in a transverse direction of the basket and the second horizontal hinge is configured such that, once connected, the second horizontal hinge extends in a longitudinal direction of the basket.

Preferably, the third horizontal hinge is configured such that, once connected, the third horizontal hinge extends in the longitudinal direction of the basket.

Preferably, the flap is of a width such that a gap is formed between the first side wall and the flap and between the second side wall and the flap, further wherein a thickness of each shelf is less than the size of each gap.

Preferably, the kit further comprises support means configured to support each shelf in the horizontal position.

Preferably, the kit further comprises securing means for securing each shelf in the stowed position, wherein the securing means comprises first engagement means located on each shelf and corresponding engagement means located on the respective side wall.

The present invention also pertains to a method of adapting a basket of a shopping or supermarket trolley. The method may be operated by a manufacturer, an upgrader (or re-manufacturer) of shopping trolleys. The method comprises receiving a nestable shopping trolley having a basket defining an interior space and having a hingable wall formed by a flap having a first horizontal hinge enabling the flap to rotate into the interior space; the method characterized by:
  connecting a first shelf having a supporting surface to a first side wall of the basket via a second horizontal hinge such that the second horizontal hinge enables movement of the first shelf between a stowed position and a horizontal position.

The method is advantageous, since it enables a manufacturer or upgrader to easily adapt a standard, nestable shopping trolley to include a shelf without altering the nesting functionality of the trolley or making other changes to the trolley.

Preferably, the first shelf and the flap are configured such that, when the flap rotates into the interior space of the basket, the flap causes the first shelf to move from the horizontal position to the stowed position and, when in the stowed position, the supporting surface of the first shelf abuts the first side wall.

Preferably, the method further comprises:
  attaching a second shelf having a supporting surface to a second side wall of the basket via a third horizontal hinge such that the third horizontal hinge enables movement of the second shelf between a stowed position and a horizontal position.

Preferably, the second shelf and the flap are configured such that, when the flap rotates into the interior space of the basket, the flap causes the second shelf to move from the horizontal position to the stowed position and, when in the stowed position, the supporting surface of the second shelf abuts the second side wall.

Preferably, the first horizontal hinge extends in a transverse direction of the basket and the first shelf is connected to the basket such that, once connected, the second horizontal hinge extends in a longitudinal direction of the basket. Once connected as required by the method of the present invention, the shelf may be automatically moved to its stowed position for storage on nesting two trolleys together without any additional effort from a user.

Preferably, the second shelf is connected to the basket such that, once connected, the second horizontal hinge extends in a longitudinal direction of the basket.

Preferably, the first and second shelves are attached such that each shelf lies in a first plane and each shelf extends between the respective side wall and a centre of the basket such that, when in the horizontal position, the first and second shelves form a first layer extending between the first and second side walls.

Preferably, the method further comprises attaching support means to the basket to support each shelf in the horizontal position.

Preferably, the method further comprises attaching first engagement means to each shelf and corresponding engagement means on the respective side wall for securing each shelf in the stowed position.

It should be noted that any feature described above may be used with any particular aspect or embodiment of the invention.

Figure 1:
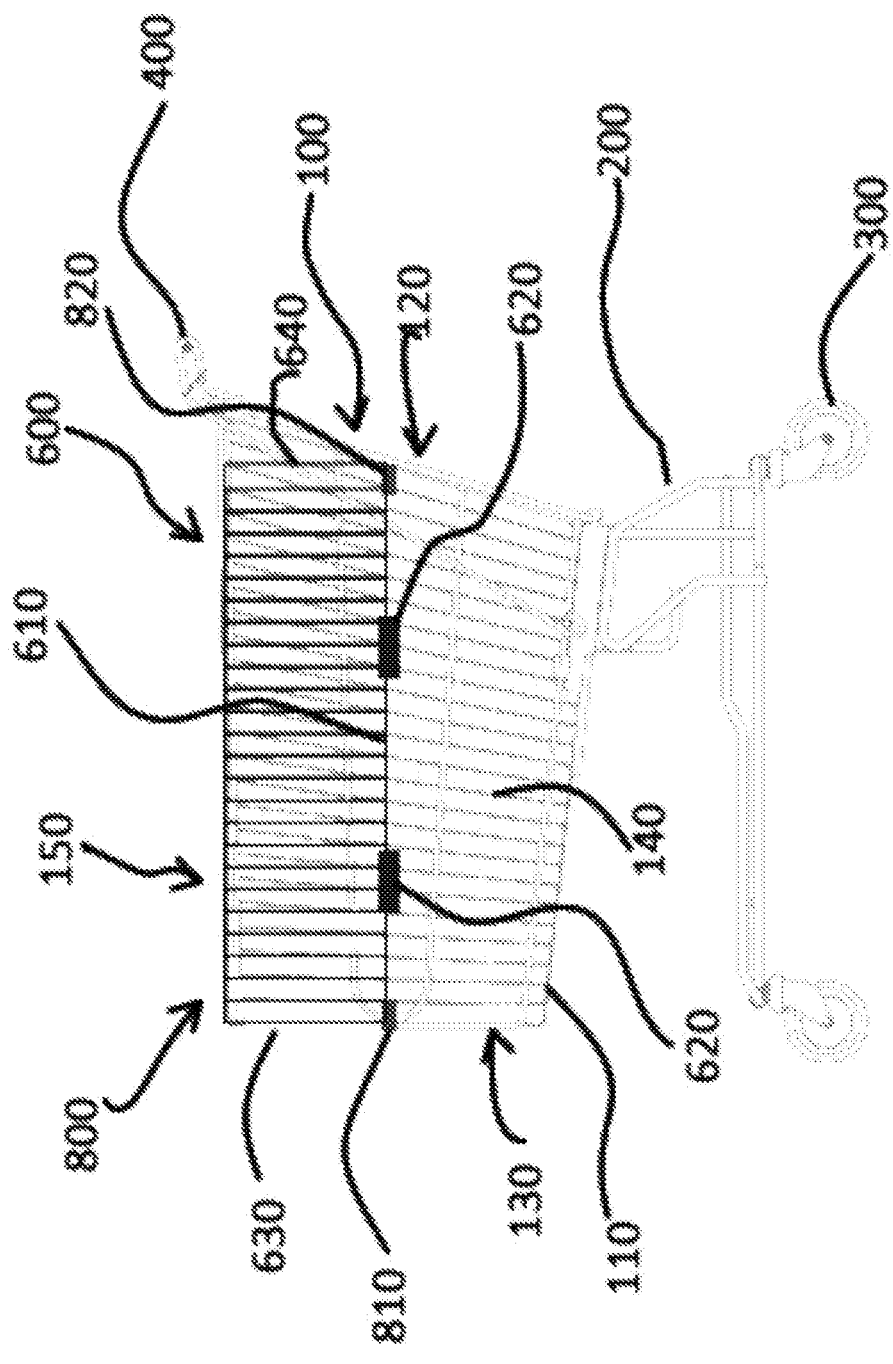
FIG. 1 shows a side view of a nestable shopping trolley in accordance with a first embodiment of the invention, wherein a first shelf is in a stowed position.

It should be noted that the figures are for illustrative purposes and are not necessarily drawn to scale.

DETAILED DESCRIPTION

The present invention relates to a nestable shopping or supermarket trolley 10. The terms horizontal, vertical, transverse, longitudinal, forward, front, rear, and back are understood to be relative terms based on the normal configuration of a shopping trolley (i.e. upright such that it may be pushed from the rear with its wheels on the ground). In the present disclosure, the term "minor" is used to indicate a small dimension (i.e. width) and the term "major" is used to indicate a larger dimension (i.e. length). The term substantially indicates a suitable configurational tolerance that allows the part or collection of components to function for its intended purpose as described herein.

The nestable shopping trolley 10 of the present invention has typical components including a basket 100 defining an interior space for holding items, a frame 200 for supporting the basket, wheels 300 attached to the frame for moving the trolley 10 along the ground and a handle 400 attached to the frame for pushing the trolley 10 from its rear. The basket 100 of the trolley is defined by a base 110, a hingable wall 120 at the rear of the trolley, a front wall 130 opposing the hingable wall 120 (i.e. at the front of the trolley) and opposing side walls 140, 150. The basket 100 extends in a longitudinal direction between the hingable wall 120 and the front wall 130 and extends in a transverse direction between the opposing side walls 140, 150. The side walls 140, 150 are substantially orthogonal or perpendicular to the hingable wall 120. However, typically, the basket is forwardly tapered and so the angle between each side wall 140, 150 and the hingable wall 120 is not precisely 90 degrees and may be in a range of, for example, 90±1 degrees, 90±3 to 5 degrees, 90±10 degrees.

The basket is typically formed with a mesh structure having horizontal and vertical, metal rods that intersect and are welded together. Therefore, the mesh has a thickness of approximately twice the diameter of the individual rods.

The hingable wall 120 of the basket is formed by a flap 125 having a first horizontal hinge 500 enabling the flap 125 to rotate into the interior of the basket 100. The term horizontal hinge refers to a hinge that enables rotation through a horizontal plane. For example, a horizontal hinge of the present invention may be a barrel hinge having a hollow cylinder containing a pivot. When arranged horizontal the barrel and cylinder are also horizontal. Here, the first horizontal hinge enables rotation of the hingable wall through the horizontal plane of the basket. The first horizontal hinge extends in a transverse direction of the basket. The width of the flap 125 is less than the distance between the opposing side walls 140, 150 at the rear of the basket 100. Therefore, gaps 126, 127 are formed on either side of the flap 125 between the flap 125 and the opposing side walls 140, 150 to prevent the side walls 140, 150 interfering with the movement of the flap 125. The flap 125 enables several shopping trolleys of the same type to be nested together. The gaps 126, 127 are generous in size to accommodate distortions in the trolley that may occur following repeated use. The gaps are at least as wide as the thickness of the mesh structure of the basket.

Figure 2:
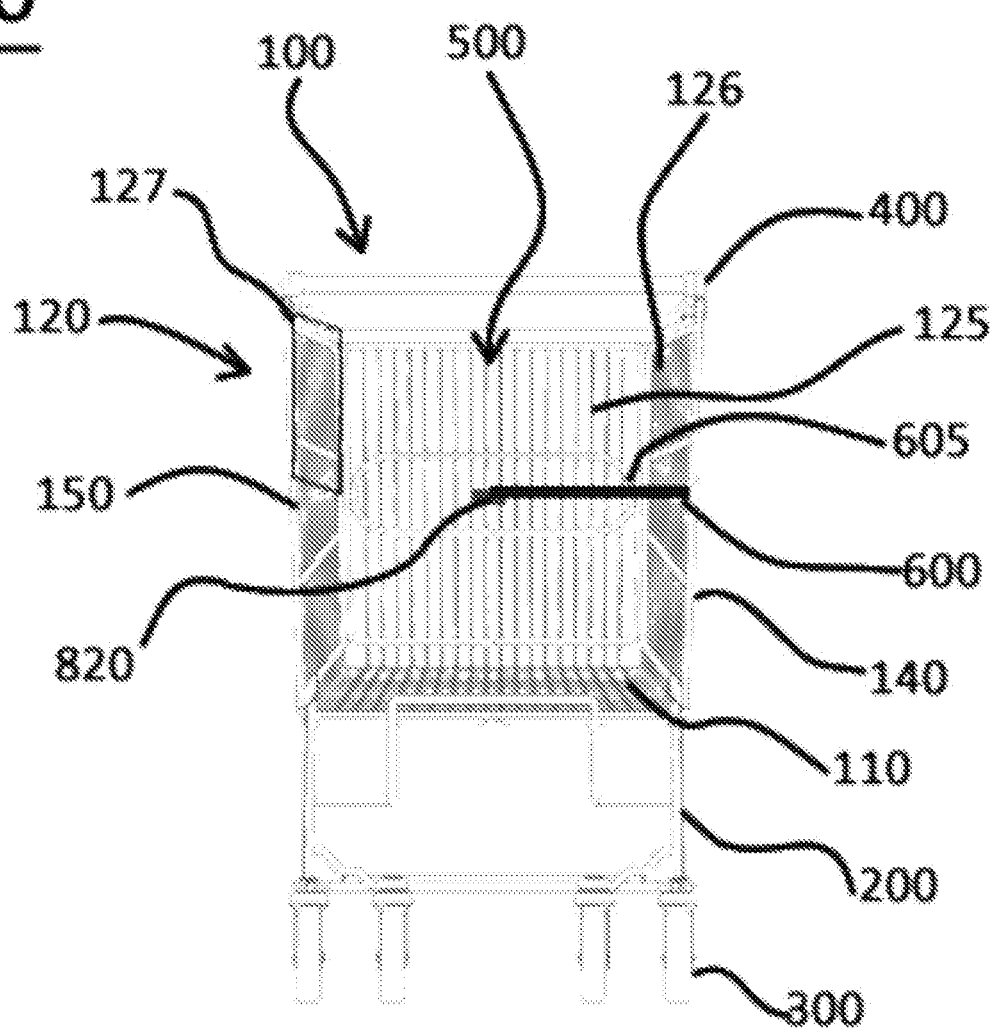
FIG. 2 shows a front view of the nestable shopping trolley of FIG. 1, with a front wall of a basket hidden and the first shelf in a horizontal position.

FIGS. 1 and 2 illustrate a nestable shopping trolley 10 in accordance with a first embodiment. The nestable shopping trolley 10 comprises at least one shelf having a supporting surface to support goods off the base 110 of the basket. In the embodiments of FIG. 1 and FIG. 2, the nestable shopping trolley comprises a first shelf 600 having a supporting surface 605. In the embodiments of FIGS. 3 to 5, the nestable shopping trolley comprises a first shelf 600 having the supporting surface 605 and a second shelf 700 having a second supporting surface 705, the first shelf 600 being in the same plane as the second shelf 700.

As shown in FIGS. 1 to 5, a major edge 610 of the first shelf 600 is attached to the first side wall 140 of the trolley via one or two or more second horizontal hinge(s) 620. As discussed above, here, the term horizontal hinge refers to a hinge that enables rotation through the horizontal plane of the basket. As shown in FIGS. 3 to 5, a major edge 710 of the second shelf 700 is attached to the second side wall 150, which opposes the first side wall 140, via one or two or more third horizontal hinge(s) 720. The second and third horizontal hinges 620, 720 extend in a longitudinal direction of the basket (i.e. the second and third horizontal hinges are substantially perpendicular or orthogonal to the first horizontal hinge, in other words, the angle between the first and second horizontal hinges and the angle between the first and third horizontal hinges may be in range of, for example, 90±1 to 5 degrees, 90±5 to 10 degrees). As best shown in FIG. 6, each of the second and third horizontal hinges 620, 720 comprise a first section 620a, 720a, which is welded to the respective shelf and a second section 620b, 720b which is attached to the basket via hooks 620c, 720c. The hooks 620c, 720c may be pinched closed or welded to the first and side walls of the basket 140, 150.

Each shelf 600, 700 is hingable between a stowed position for storage of the shelf 600, 700 (or when the trolley 10 is nested with other trolleys) and a horizontal position for use of supporting (i.e. upper) surface 605, 705 of each shelf 600, 700 to support goods off the base 110 of the basket 100. FIGS. 1, 3D, 4D and 5D show the stowed positions and FIGS. 2, 3A, 4A and 5A show the horizontal positions.

In the stowed position, each shelf 600, 700 is substantially parallel to the side walls 140, 150 of the basket 100 (and rests vertically). In the horizontal position, each shelf 600, 700 is substantially orthogonal to (or perpendicular from) the side walls 140, 150 of the basket 100 (i.e. horizontal). Each shelf 600, 700 moves between the stowed position and the horizontal (or in use or supporting) position by rotating about the respective horizontal hinge(s) 620, 720.

The dimensions of the shelves 600, 700 are typically those shown in FIGS. 1 to 5 and are selected such that the shelves 600, 700 do not obstruct the nesting of two trolleys 10 of the present invention together. As shown in those figures, each shelf 600, 700 comprises a first end 630, 730 proximal to the front wall 130 of the basket 100 (i.e. in the normal direction of travel for the trolley 10) and a second end 640, 740 proximal to the hingable wall 120 of the basket 100 (i.e. the end of the trolley 10 that is usually pushed).

As shown in FIGS. 1 to 5, each shelf 600, 700 is of a width such that it extends between the respective side wall 140, 150 and a centre of the basket 100 (i.e. has a width of half the width of the trolley. As discussed above, both the first shelf 600 and the second shelf 700 are in the same plane (i.e. are at the same distance from the base of the trolley 10). Therefore, when in the horizontal position, the first and second shelves 600, 700 form a first layer extending between the first and second side walls 140, 150 and between the hingable wall 120 and the front wall 130.

Each shelf 600, 700 is formed of the same or similar rods as the basket so that the thickness of each shelf is the same or less than the thickness of the mesh forming the basket. In other words, the thickness of each shelf 600, 700 is less than the size of each gap 126, 127 between the flap 125 and the first and second sidewalls 140, 150. Therefore, when in the stowed position, the supporting surface 605, 705 of each shelf 600, 700 abuts the respective sidewall 140, 150 without obstructing movement of the flap 125 past the shelves 600, 700.

In the embodiments shown in FIGS. 1 to 5, each shelf 600,700 is positioned at a height such that, when in the stowed position, it does not extend beyond a top, major edge of the sidewalls 140, 150 of the basket 100. Typically, as discussed above, the width of each shelf 600, 700 is half the width of the basket 100. Therefore, each shelf 600, 700 should be positioned at a distance from the top, major edge of the side walls 140, 150 equal to half the width of the basket 100.

Figure 4A:
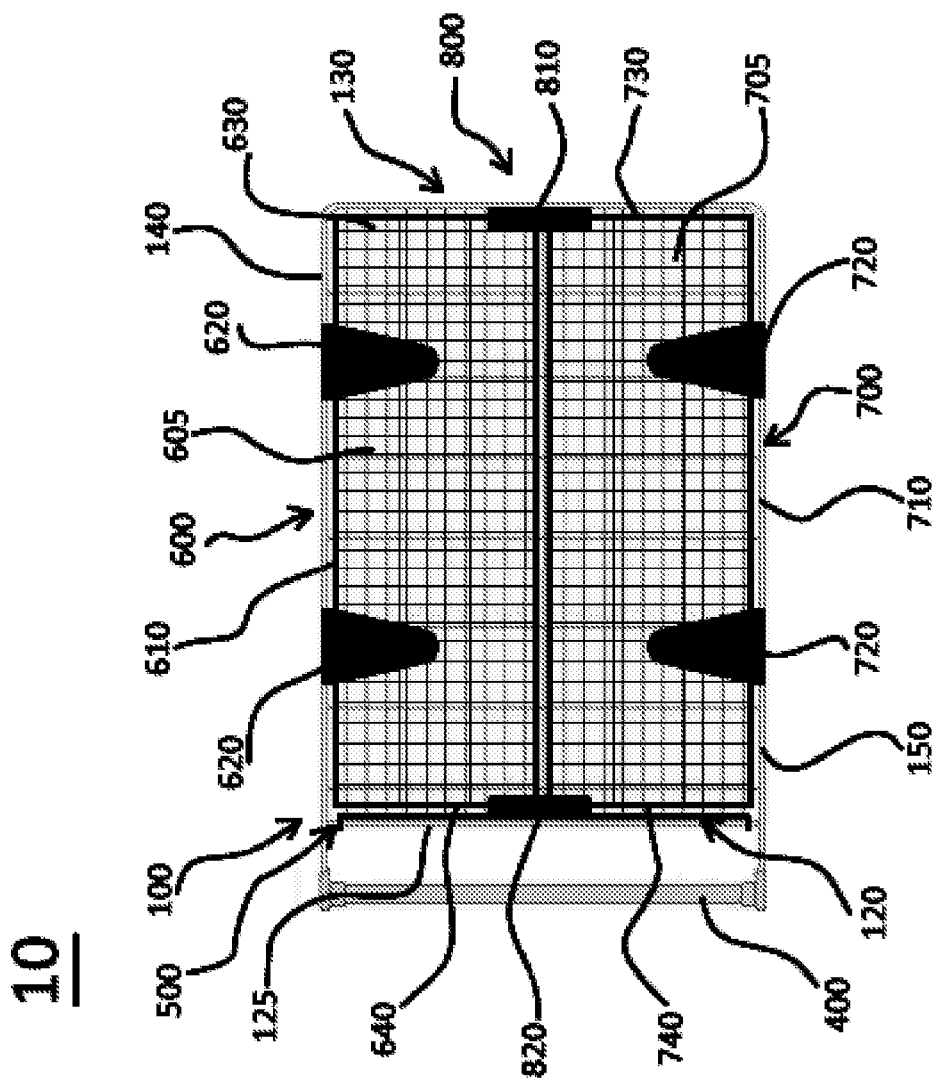
FIGS. 4A to 4D show top views illustrating the sequence of nesting shown in FIG. 3, the second nestable shopping trolley is hidden.
Figure 4B:
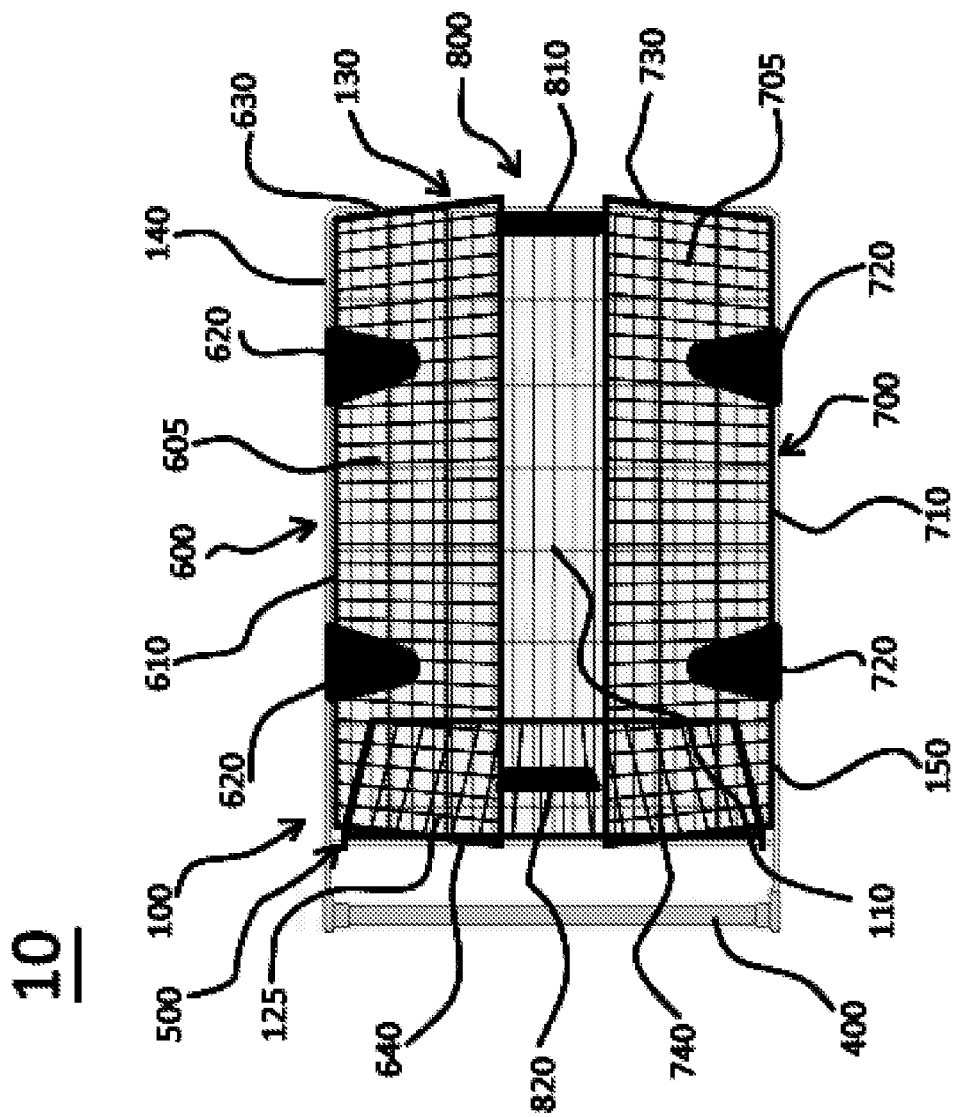
Figure 4C:
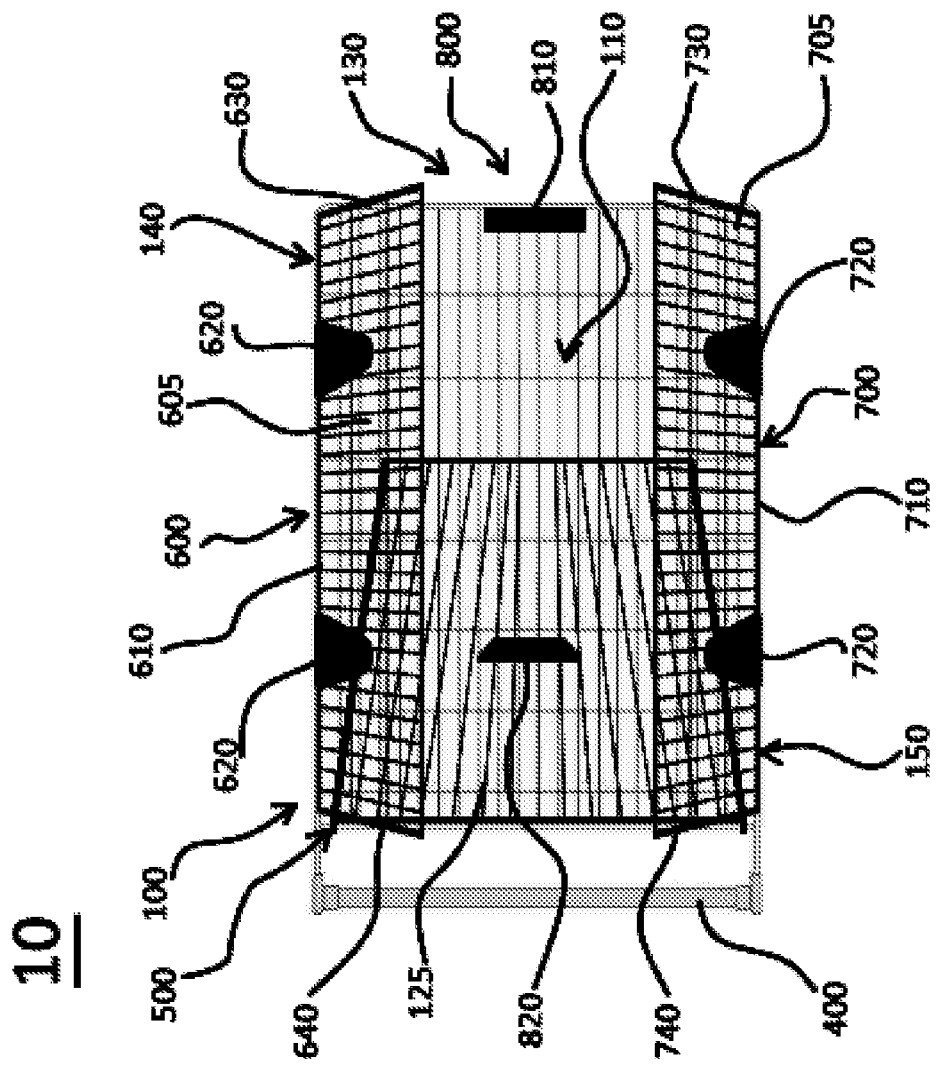

As best shown in FIGS. 4A and 6, support means 800 are attached to the hingable wall 120 and the front wall 130 of the basket 100 and are configured to support the first end 630, 730 and the second end 640, 740 of each shelf 500 when in the horizontal position. More specifically, the support means 800 are L-shaped brackets with a first L-shaped bracket 810 attached to the front wall 130 and a second L-shaped bracket 820 attached to the hingable wall 120. Each L-shaped bracket 810, 820 has a first portion 810a, 820a parallel to the front wall 130 (i.e. vertical) and a second portion 810b, 820b perpendicular to the front wall 130 (i.e. horizontal). The second portion 810b, 820b is of a length such that both the first and second shelves 600, 700 may be supported by the L-shaped brackets 810, 820 when in the horizontal position. Each L-shaped bracket 810, 820 is attached to the basket 100 via hooks 810c, 820c extending from the first portion 810a, 820a. The hooks 810c, 820c may be pinched closed or welded to the basket 100.

Kit Assembly

The present invention also pertains to a kit and method for adapting a basket 100 of a nestable shopping trolley 10. The kit and method may be implemented by a manufacturer or an upgrader of shopping trolleys 10. FIG. 6 is an exploded view of parts of the kit for adapting a nestable shopping trolley. The kit of FIG. 6 comprises two L-shaped brackets 810, 820, first and second shelves 600, 700 with two horizontal hinges 620, 720 attached to the major edge 610, 710 of each shelf 600, 700. These components have been discussed above. Typically, the horizontal hinges 620, 720 are welded to the major edge 610, 710 of each shelf 600, 700. However, the horizontal hinges 620, 720 may instead be attached with fixings including nuts and bolts, screws, plates or clamps, for example.

Firstly, an upgrader or manufacturer (or re-manufacturer) would receive a nestable shopping trolley or a basket of a nestable shopping trolley having typical components, which are discussed above. Subsequently, one L-shaped bracket 810 would be hooked onto the front wall 130 of the basket 100 and one L-shaped bracket 820 would be hooked onto the hingable wall 120 of the basket 100. The brackets 810, 820 would be positioned centrally of the front and hingable walls 130, 120 at a height selected by the upgrader or manufacturer. Once in place, the hooks 810c, 820c would be pinched closed to secure the L-shaped brackets 810, 820 in place. Alternatively or additionally, the hooks 810c, 820c could be welded to the basket 100.

Next, the first shelf 600 would be attached to the first side wall 140 of the basket 100 such that the second horizontal hinge(s) 620 extends in the longitudinal direction of the basket. The first shelf 600 would be attached at a height such that it rests on the brackets 810, 820 when in the horizontal position. The first shelf 600 would be attached to the first side wall of the basket 140 by hooking the second horizontal hinge(s) 620 onto the first side wall 140.

Similarly, the second shelf 700 would be attached to the second side wall 150 of the basket 100 such that the third horizontal hinge(s) 720 extends in the longitudinal direction of the basket. The second shelf 700 would be attached such that it is in the same plane as the first shelf 600 and also rests on the brackets 810, 820 when in the horizontal position. The second shelf 700 would be attached to the second side wall 150 of the basket 100 by hooking the third horizontal hinge(s) 500 onto the second side wall 150. The hooks 620c, 720c attached to each shelf 600, 700 would then be pinched closed or welded to the basket 100.

Nesting Operation

When nesting two trolleys 10 of the present invention together, advantageously, each shelf 600, 700 is also automatically moved to its stowed position for storage without any additional action from a user (i.e. by the action of pushing the front of one trolley into the rear of another). The steps involved in nesting two trolleys 10 of the present invention together are shown in FIGS. 3A to 3D, 4A to 4D and 5A to 5D.

Figure 3A:
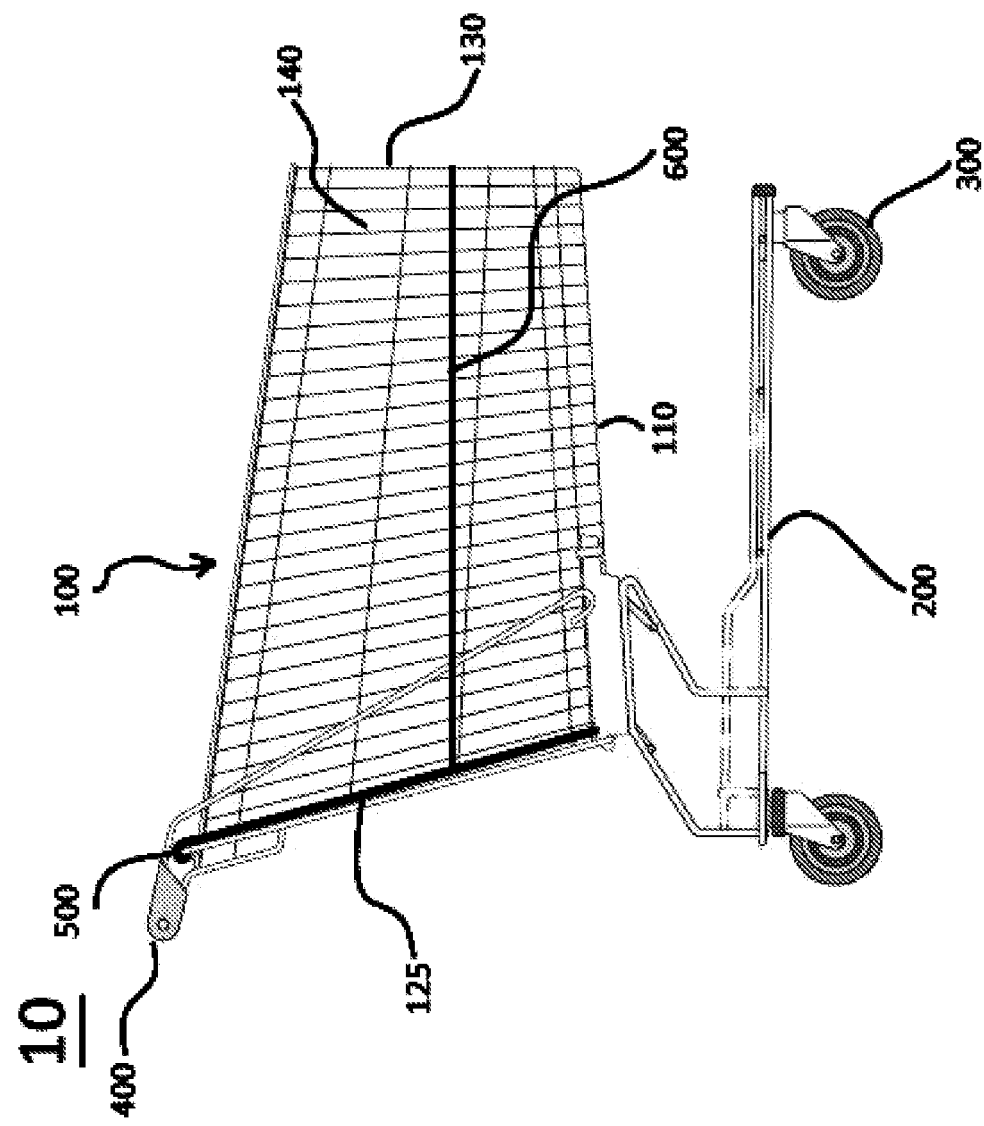
FIGS. 3A to 3D show side views illustrating a sequence of nesting a second nestable shopping trolley into the basket of a first nestable shopping trolley in accordance with a second embodiment of the invention, the second nestable shopping trolley is hidden.
Figure 3B:
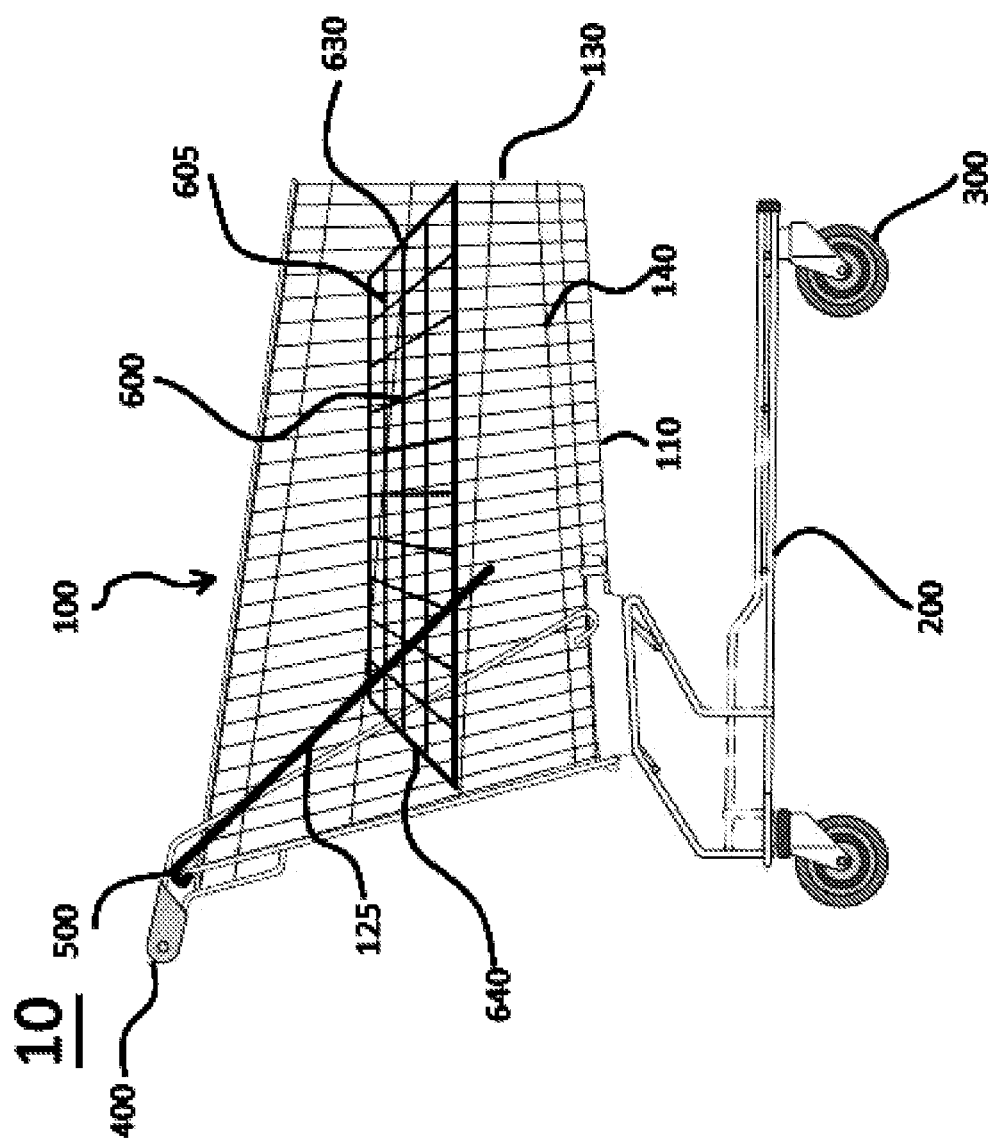
Figure 3C:
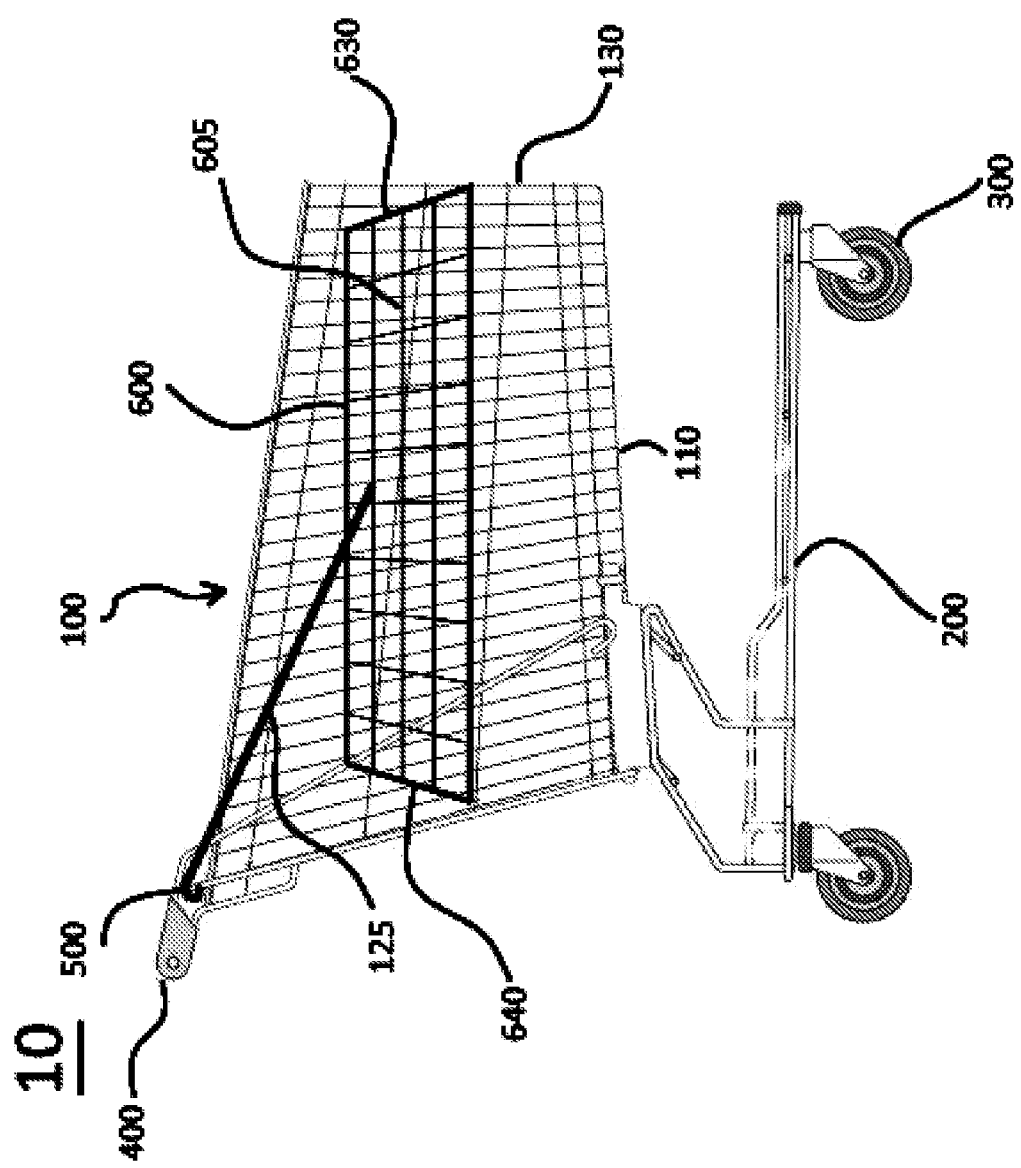
Figure 5A:
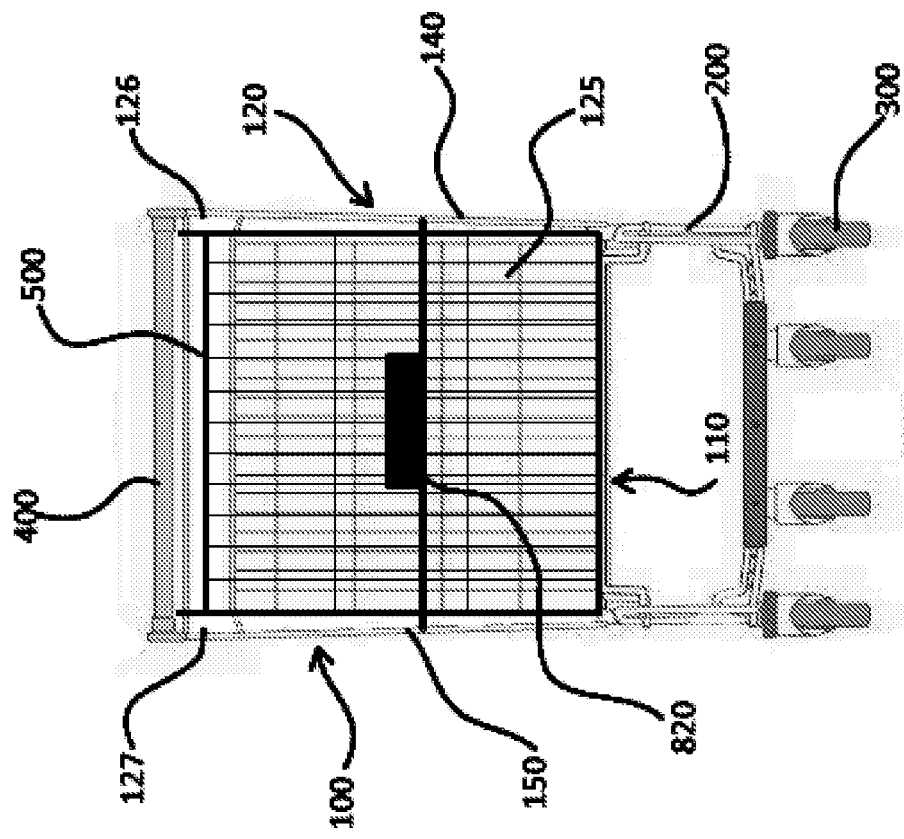
FIGS. 5A to 5D show rear views illustrating the sequence of nesting shown in FIG. 3, the second nestable shopping trolley is hidden.
Figure 5B:
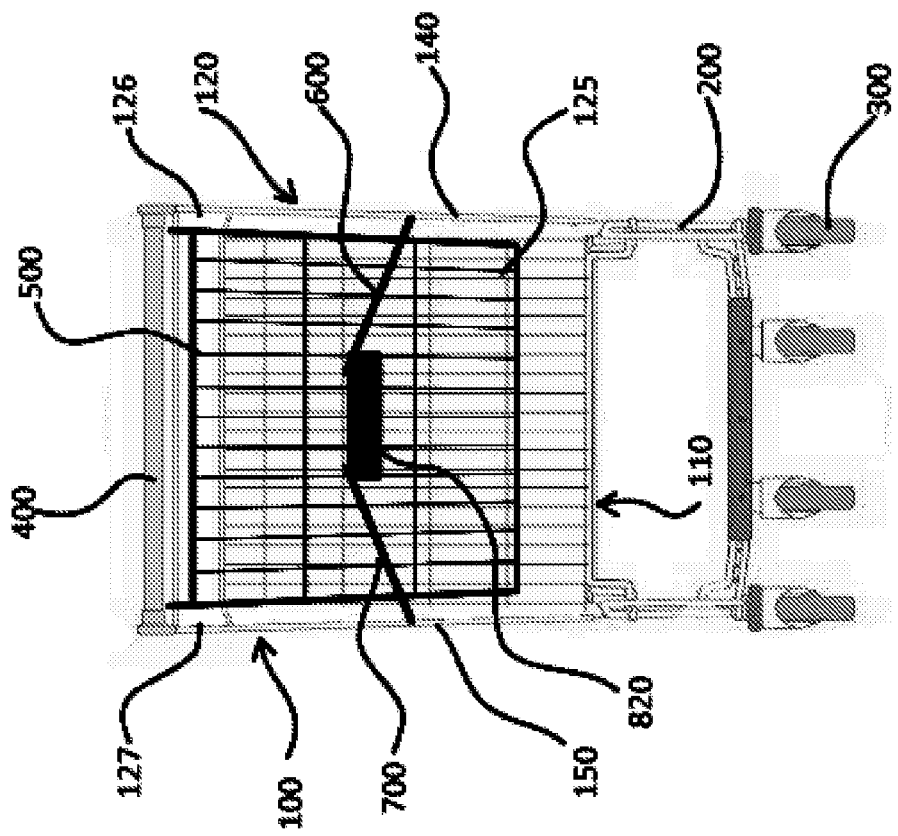
Figure 5C:
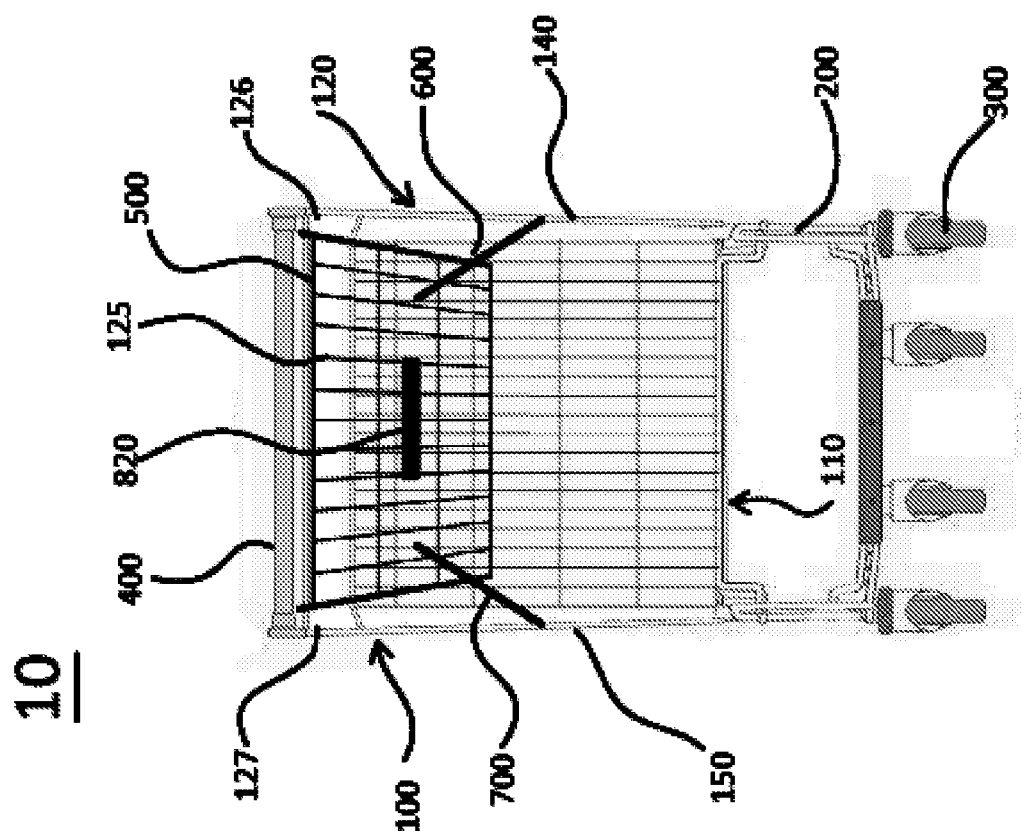
Figure 6:
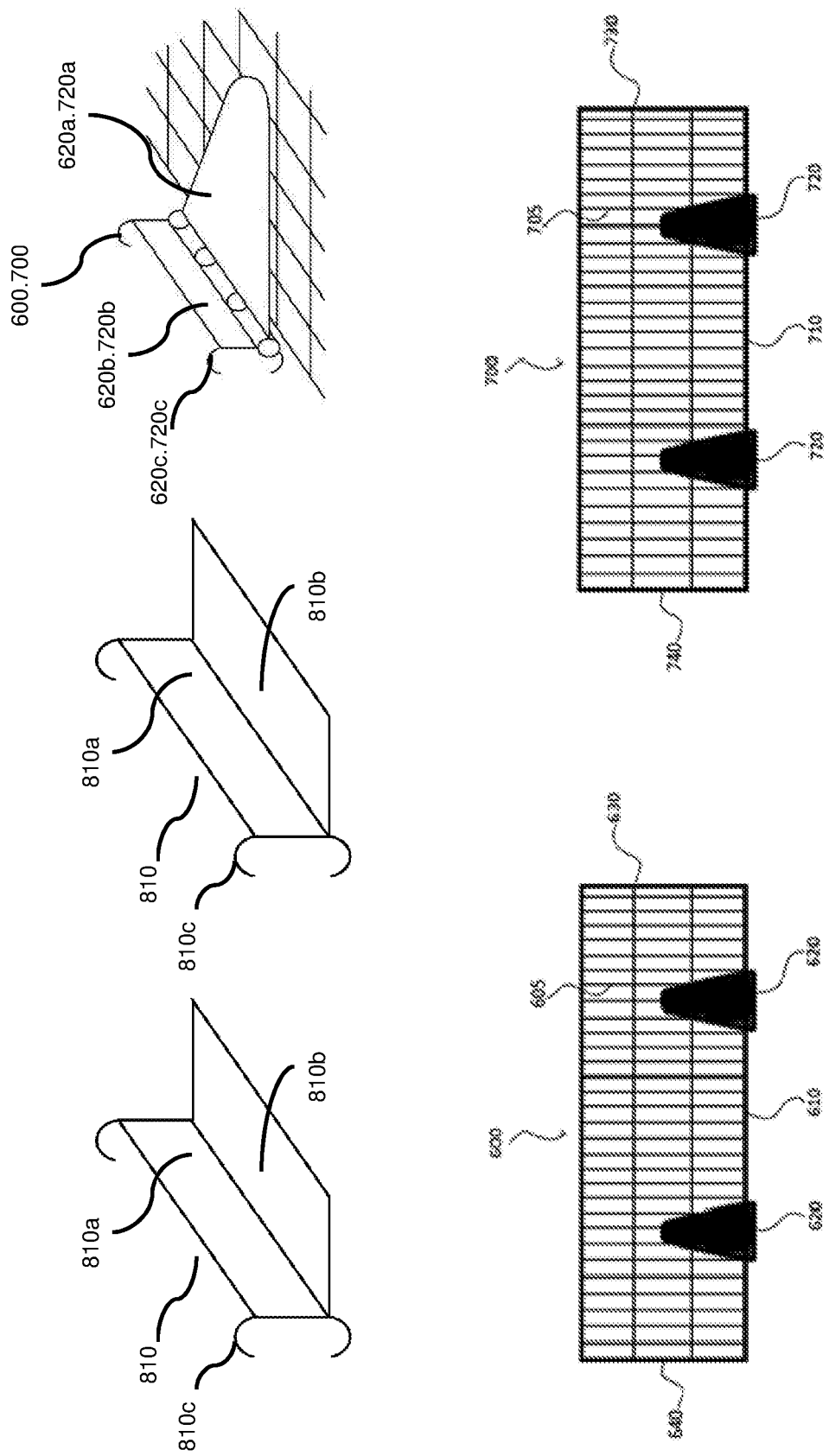
FIG. 6 shows an exploded view of parts of a kit for adapting a nestable shopping trolley in accordance with the present invention.

Typically, prior to nesting the trolleys 10 together, each shelf 600, 700 would be in the horizontal position, as shown in FIGS. 3A, 4A and 5A. On nesting two trolleys 10 of the present invention together, the front wall 130 of the basket 100 of a second trolley pushes the flap 125 of a first trolley 10 into the interior of the basket 100 of the first trolley 10 and upwards. The upward movement of the flap 125 causes each shelf 600, 700 to also move upwards without causing jamming of the shelves 600, 700 and the flap 125, as shown in FIGS. 3B, 3C, 4B, 4C, 5B and 5C. This is achieved by ensuring that the first horizontal hinge 500 (the hinge of the hingable wall 120) extends in the transverse direction of the basket and the second and third horizontal hinges 620, 720 extend in the longitudinal direction of the basket (i.e. the hinge 500 of the hingable wall 120 is substantially perpendicular to the hinges 620, 720 of the side walls 140, 150).

Figure 3D:
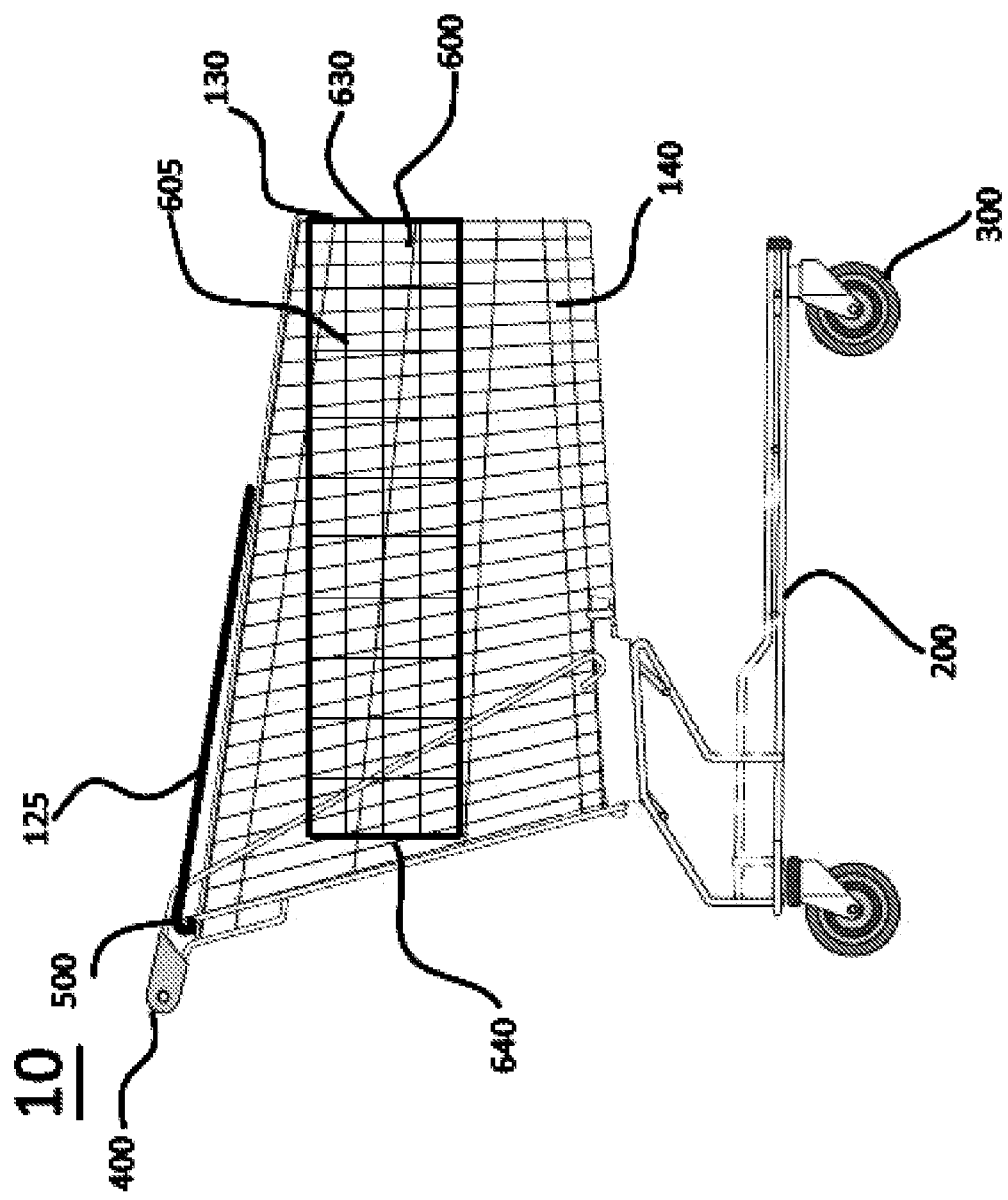
Figure 4D:
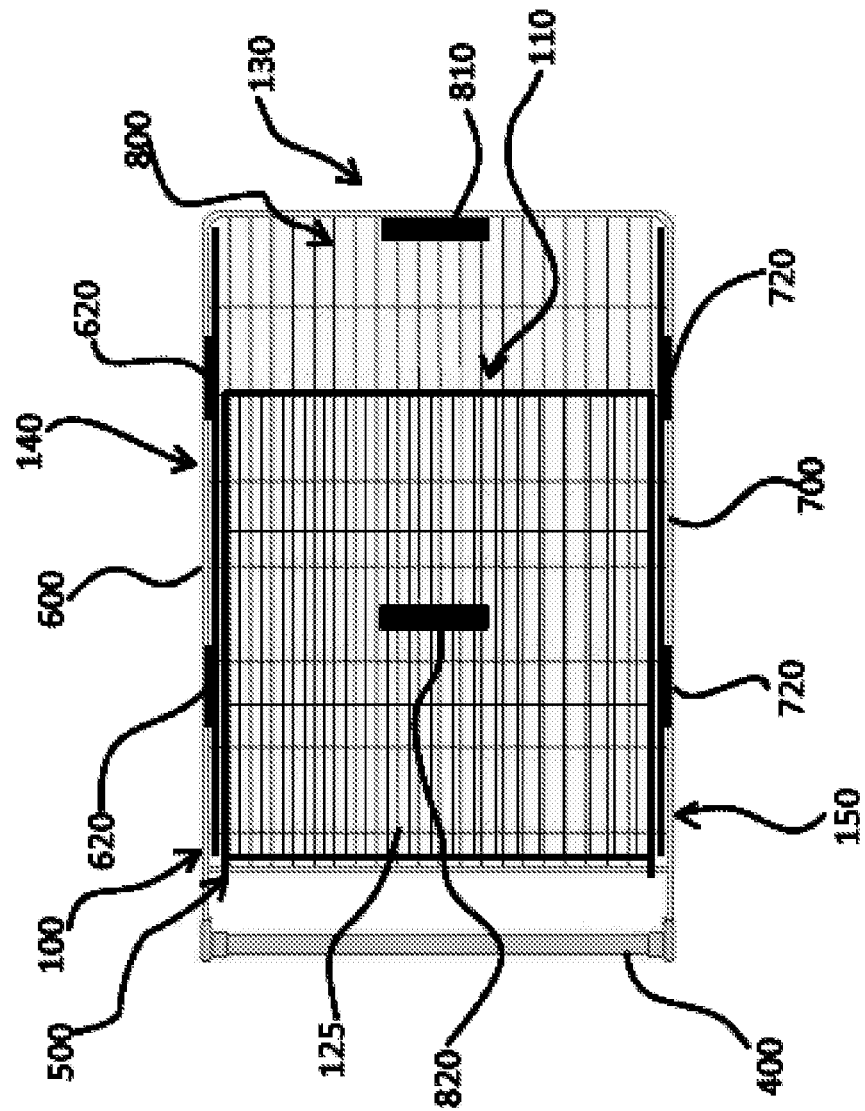
Figure 5D:
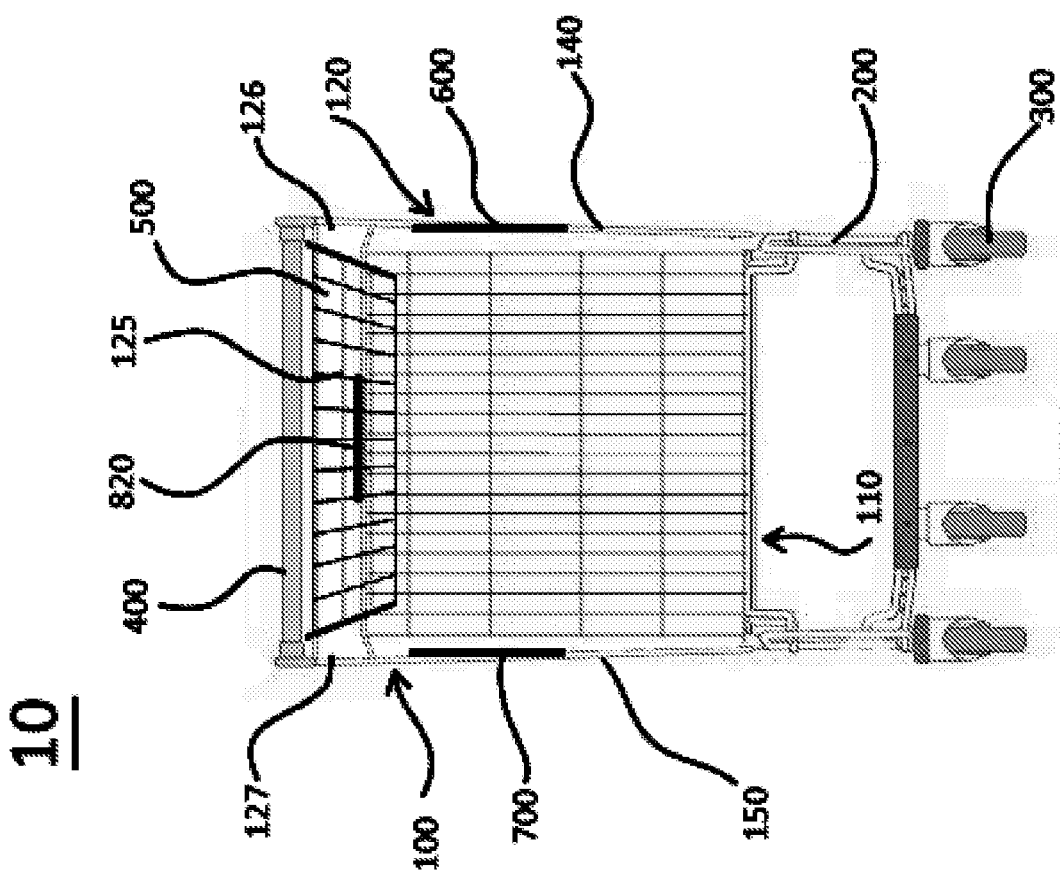

The shelves 600, 700 are moved upwards by the flap 125 until they reach the stowed (vertical) position, as shown in FIGS. 3D, 4D and 5D. In the stowed, position, the supporting surface 605, 705 of each of the first and second shelves 600, 700 abuts the respective side wall 140, 150. As discussed above, the thickness of each of the first and second shelves 600, 700 is less than the size of each gap 126, 127 on either side of the flap 125, between the flap 125 and each of the opposing side walls 140, 150. Therefore, once each shelf 600, 700 has been moved into its stowed position, movement of the flap 125 upward beyond the shelves 600,700 is not obstructed. The shelves 600, 700 may be held in the stowed position by the side walls of the second trolley, which, once inside the basket of the first trolley, exerts an opposing force on each shelf 600, 700 that counteracts the gravitational force driving the shelves 600, 700 from the stowed position to the horizontal position. Additionally, securing means for securing each shelf in the stowed position may be provided, the securing means comprising first engagement means located on each shelf and corresponding engagement means located on the respective side wall. The upward movement of the hingable wall 120 may cause the first engagement means on each shelf 600, 700 to engage with the corresponding engagement means on the basket 100 thereby securing each shelf 600, 700 in the stowed position. By way of example, the first engagement means may be a first magnet or ferromagnetic material and the second engagement means may be a second magnet or ferromagnetic material subject to the magnetic attraction of the first magnet or ferromagnetic material.

On disengaging the trolleys 10, the flap 125 returns under gravitational force to form the hingable wall 120 of the basket 100. The shelves 600, 700 may remain in the stowed position and are of a thickness such that, when in the stowed position, movement of the flap 125 is not obstructed by the shelves 600, 700. Once the flap 125 has been returned to form the hingable wall 120 of the basket 100, a user may then access each shelf 600, 700, disengage each shelf 600, 700 from the stowed position and move each shelf 600, 700 from the stowed (vertical) position to the horizontal configuration for use.

Whilst a number of embodiments have been described, it will be understood that these are for the purposes of illustration only and that the invention is not so limited. The skilled reader will envisage various modifications and alternatives that fall within the scope of the claims.

Whilst the nestable shopping trolley 10 of the present invention has been described to have a first and a second shelf 600, 700, the skilled person would readily appreciate that the nestable shopping trolley 10 may have a plurality of shelves forming a plurality of layers within the basket 100 as described above. The nestable shopping trolley 10 may have two or three layers or more. The layers may be positioned at different heights (i.e. distances from the base of the trolley).

Each of the second and third horizontal hinges 620, 720 may not be welded to the respective shelf but may instead be attached with fixings including nuts and bolts, screws, plates or clamps, for example. The second and third horizontal hinges 620, 720 also may not comprise hooks 620c, 720c for attachment to the basket 100 of the trolley 10 and may instead be directly welded onto the basket 100.

Whilst the support means 800 has been described to be first and second L-shaped brackets 810, 820, of course alternative means for securing each shelf 600, 700 in the horizontal position may be provided. For example, primary engagement means may be provided on the minor wall each of each shelf and corresponding secondary engagement means may be provided on the front and hingable walls 120, 130 at a height so as to engage with the primary engagement means when each shelf 600, 700 is in the horizontal position.

Securing means comprising first engagement means located on each shelf and corresponding engagement means located on the respective side wall for securing each shelf in the stowed position may not be provided. Instead, the second and third horizontal hinges 620, 720 may be spring loaded such that a retaining force is exerted on each shelf 600, 700 to secure each shelf 600, 700 in the stowed position when not in use.

Whilst in the described embodiments, on nesting two trolleys together, the flap causes each shelf to move from the horizontal position to the stowed position, the skilled person would readily appreciate that the flap may not interact with the shelf or shelves and each shelf may instead be manually moved between the horizontal position and the stowed position by a user.

The invention claimed is:

1. A nestable shopping trolley comprising:
    a basket defining an interior space and having a hingable wall formed by a flap having a first horizontal hinge enabling the flap to rotate into the interior space;
 characterized by:
    a first shelf having a supporting surface, a stowed position and a horizontal position; and
    a second horizontal hinge connecting the first shelf to a first side wall of the basket, wherein the second horizontal hinge enables movement of the first shelf between the stowed and horizontal positions,
    wherein the first shelf and the flap are configured such that, when the flap rotates into the interior space of the basket, the flap causes the first shelf to move from the horizontal position to the stowed position and, when in the stowed position, the supporting surface of the first shelf abuts the first side wall.

2. The nestable shopping trolley of claim 1 further comprising:
    a second shelf having a supporting surface, a stowed position and a horizontal position; and
    a third horizontal hinge connecting the second shelf to a second side wall of the basket, wherein the second side wall opposes the first side wall, wherein the third horizontal hinge enables movement of the second shelf between the stowed and horizontal positions.

3. The nestable shopping trolley of claim 2, wherein the second shelf and the flap are configured such that, when the flap rotates into the interior space of the basket, the flap causes the second shelf to move from the horizontal position to the stowed position and, when in the stowed position, the supporting surface of the second shelf abuts the second side wall.

4. The nestable shopping trolley of claim 1, wherein the first horizontal hinge extends in a transverse direction of the basket and the second horizontal hinge extends in a longitudinal direction of the basket.

5. The nestable shopping trolley of claim 2, wherein the third horizontal hinge extends in the longitudinal direction of the basket.

6. The nestable shopping trolley claim 1, wherein the flap is of a width such that a gap is formed between the first side wall and the flap and between the second side wall and the flap, further wherein a thickness of each shelf is less than the size of each gap.

7. The nestable shopping trolley of claim 2, wherein each shelf is located in a first plane and extends between the respective side wall and a centre of the basket such that, when in the horizontal position, the first and second shelves form a first layer extending between the first and second side walls,
wherein each shelf extends between a first end proximal to the hingable wall and a second end proximal to a front wall, the front wall opposing the hingable wall, such that, when in the horizontal position, the first and second shelves form a first layer extending between the hingable wall and the front wall.

8. The nestable shopping trolley of claim 1, further comprising support means configured to support each shelf in the horizontal position and/or further comprising securing means for securing each shelf in the stowed position, wherein the securing means comprises first engagement means located on each shelf and corresponding engagement means located on the respective side wall, wherein the first engagement means is a first magnet and the second engagement means is a second magnet subject to the attraction of the first magnet.

9. A kit for adapting a basket of a nestable shopping trolley, the basket defining an interior space and having a hingable wall formed by a flap having a first horizontal hinge enabling the flap to rotate into the interior space, the kit comprising:
a first shelf having a supporting surface; and
a second horizontal hinge fixed to the first shelf and configured to connect the first shelf to a first side wall of the basket such that, once connected, the second horizontal hinge enables movement of the first shelf between a stowed position and a horizontal position,
wherein the first shelf and the flap are configured such that, when the flap rotates into the interior space of the basket, the flap causes the first shelf to move from the horizontal position to the stowed position and, when in the stowed position, the supporting surface of the first shelf abuts the first side wall.

10. The kit of claim 9 further comprising:
a second shelf having a supporting surface;
a third horizontal hinge fixed to the second shelf and configured to connect the second shelf to a second side wall of the basket such that, once connected, the third horizontal hinge enables movement of the second shelf between a stowed position and a horizontal position.

11. The kit of claim 10, wherein the second shelf and the flap are configured such that, when the flap rotates into the interior space of the basket, the flap causes the second shelf to move from the horizontal position to the stowed position and, when in the stowed position, the supporting surface of the second shelf abuts the second side wall.

12. The kit of claim 9, wherein the first horizontal hinge extends in a transverse direction of the basket and the second horizontal hinge is configured such that, once connected, the second horizontal hinge extends in a longitudinal direction of the basket.

13. The kit of claim 10, wherein the third horizontal hinge is configured such that, once connected, the third horizontal hinge extends in the longitudinal direction of the basket.

14. The kit of claim 9, wherein the flap is of a width such that a gap is formed between the first side wall and the flap and between the second side wall and the flap, further wherein a thickness of each shelf is less than the size of each gap.

15. The kit of claim 9 further comprising support means configured to support each shelf in the horizontal position and/or further comprising securing means for securing each shelf in the stowed position, wherein the securing means comprises first engagement means located on each shelf and corresponding engagement means located on the respective side wall.

16. A method of adapting a basket of a nestable shopping trolley comprising:
receiving a nestable shopping trolley having a basket defining an interior space and having a hingable wall formed by a flap having a first horizontal hinge enabling the flap to rotate into the interior space; and
connecting a first shelf having a supporting surface to a first side wall of the basket via a second horizontal hinge such that the second horizontal hinge enables movement of the first shelf between a stowed position and a horizontal position,
wherein the first shelf and the flap are configured such that, when the flap rotates into the interior space of the basket, the flap causes the first shelf to move from the horizontal position to the stowed position and, when in the stowed position, the supporting surface of the first shelf abuts the first side wall.

17. The method of claim 16 further comprising:
attaching a second shelf having a supporting surface to a second side wall of the basket via a third horizontal hinge such that the third horizontal hinge enables movement of the second shelf between a stowed position and a horizontal position.

18. The method of claim 17, wherein the second shelf and the flap are configured such that, when the flap rotates into the interior space of the basket, the flap causes the second shelf to move from the horizontal position to the stowed position and, when in the stowed position, the supporting surface of the second shelf abuts the second side wall.

19. The method of claim 17, wherein the first and second shelves are attached such that each shelf lies in a first plane and each shelf extends between the respective side wall and a centre of the basket such that, when in the horizontal position, the first and second shelves form a first layer extending between the first and second side walls.

20. The method of claim 16 further comprising attaching support means to the basket to support each shelf in the horizontal position, and/or further comprising attaching first engagement means to each shelf and corresponding engagement means on the respective side wall for securing each shelf in the stowed position.

* * * * *